United States Patent
Duss et al.

(10) Patent No.: US 9,156,246 B2
(45) Date of Patent: Oct. 13, 2015

(54) METHOD AND DEVICE FOR THE QUALITY INSPECTION AND TESTING OF FLAT PRINTED PRODUCTS

(75) Inventors: Hanspeter Duss, Buchs (CH); Christoph Gysin, Ormalingen (CH)

(73) Assignee: Mueller Martini Holding AG, Hergiswil (CH)

( * ) Notice: Subject to any disclaimer, the term of this patent is extended or adjusted under 35 U.S.C. 154(b) by 637 days.

(21) Appl. No.: 13/547,538

(22) Filed: Jul. 12, 2012

(65) Prior Publication Data
US 2013/0016208 A1 Jan. 17, 2013

Related U.S. Application Data

(60) Provisional application No. 61/507,274, filed on Jul. 13, 2011.

(51) Int. Cl.
*H04N 7/18* (2006.01)
*B41F 33/00* (2006.01)
*B41F 1/28* (2006.01)

(52) U.S. Cl.
CPC ............. *B41F 33/0036* (2013.01); *B41F 1/28* (2013.01); *H04N 7/188* (2013.01)

(58) Field of Classification Search
CPC .... B41F 33/0036; B41F 1/28; G01N 21/8851
USPC .............. 348/92, 86, 180, 189, 190; 382/112; 198/339.1, 341.06
See application file for complete search history.

(56) References Cited

U.S. PATENT DOCUMENTS

| 6,072,899 A | 6/2000 | Irie et al. |
| 2007/0007432 A1* | 1/2007 | Tatarczyk et al. .......... 250/208.1 |
| 2011/0158484 A1* | 6/2011 | Mader ........................ 382/112 |

FOREIGN PATENT DOCUMENTS

| EP | 2 026 279 A1 | 2/2009 |
| WO | WO 2009/140778 A1 | 11/2009 |
| WO | WO 2009/140779 A1 | 11/2009 |
| WO | WO 2010/009561 A1 | 1/2010 |

OTHER PUBLICATIONS

International Search Report for related Swiss Patent Application No. 1193/2011, dated Oct. 21, 2011.

* cited by examiner

*Primary Examiner* — Jefferey Harold
*Assistant Examiner* — Jean W Desir
(74) *Attorney, Agent, or Firm* — Venable LLP; Robert Kinberg

(57) ABSTRACT

A method and a device for the quality inspection and testing of a flat print product. A print product, including at least one structural element, is initially deposited on a support element and illuminated by at least one light source. At least one image of the illuminated print product is generated using at least one image recording unit. An image is also generated of at least one structural element on the support element and a geometric object of the support element is determined from the at least one structural element of the support element. Actual values for the at least one geometric object of the support element are compared to predetermined desired values for this geometric object and the result of the comparison is used for controlling the further processing of the print product.

27 Claims, 6 Drawing Sheets

METHOD AND DEVICE FOR THE QUALITY INSPECTION AND TESTING OF FLAT PRINTED PRODUCTS

CROSS-REFERENCE TO RELATED APPLICATIONS

This application claims the priority benefit under 35 U.S.C. §119(e) of U.S. Provisional Application No. 61/507,274, filed on Jul. 13, 2011, the entire disclosure of which is hereby incorporated by reference.

BACKGROUND

1. Field of Invention

The invention relates to a method for quality inspection and testing of a flat print product, to a device for realizing the method, and to a support element which can be used with the device.

2. Related Art

An optical control method for the further print processing is known from the international patent application publication WO2009/140779 A1. With this method, flat print products which are positioned on a conveying device are moved along a conveying section, passing at least one image recording unit which records images of the print products and at least a section of the conveying device. These images, which respectively represent actual values, are compared in an evaluation unit with desired values, wherein irregularities of the conveying device are detected and corresponding signals are generated. With a different image processing method according to the publication WO2009/140779 A1, the edges of a print product, positioned on the conveying device, are detected by moving the conveying device with the print product between an optical sensor and an illumination element. The print products rest on support surfaces with uniformly spaced perforations which are light-permeable. Owing to the illumination from one side, shadow images are generated on the other side of the conveying device which are then recorded by the image-detection device. As a result, the contours of the print products and possibly occurring irregularities in the conveying section, such as dirt particles, can be detected in the area of the support surface that is not concealed by the print product.

An optical position detection device is known from the international patent application publication WO2009/140778 A1. In the same way as disclosed in the publication WO 2009/140779 A1, this solution calls for the print products positioned on a conveying device to be guided through between one or several light sources and an image-detection unit. In the process, the contours of the print products are detected, wherein different algorithms are used for evaluating the recorded images.

To be sure, the use of this method and/or device for the position detection and the further print processing make it possible to detect the position of a print product on the conveying device and thus also permit an automatic detection of incorrect placements and/or of incorrect contours of a print product, for example in particular the detection of dirt deposited along the conveying section. However, it is not possible to detect errors and/or irregularities in the condition of the print product itself since the surface of the print product is invisible to the image detection unit.

SUMMARY

It is an object of some embodiments of the present invention to provide a method and a device which may ensure an automatic detection of irregularities in a flat print product and thus improve the quality inspection and testing during the production of the print product. It is furthermore an object of embodiments of the invention to make available a flexible infrastructure for supplying and/or removing a print product, in particular for use with such a device.

The first object may be achieved with a method according to an embodiment of the invention for the quality inspection and testing of a flat print product. With this method, the print product is initially deposited on a support element, whereupon the print product and the support element are illuminated by at least one light source. Following this, at least one image of the illuminated print product, containing a structural element of the print product, is recorded with at least one image recording unit. At least one geometric object of the print product is then determined in an evaluation unit based on the at least one structural element, and the actual values for the at least one geometric object are then compared to predetermined desired values for this geometric object. Finally, the result of this comparison is used for controlling a further processing of the print product. At least one structural element of the support element is furthermore also recorded in addition to the at least one structural element of the print product, and a geometric object of the support element is determined from the at least one structural element of the support element. Following this, actual values for the at least one geometric object of the support element are then compared to predetermined desired values for this geometric object. Finally, the result of the comparison is used for controlling the further processing of the print product.

According to an embodiment, the geometric objects determined based on the structural elements of the print product and the structural elements of the support element are linked to each other and if an actual angle of the geometric objects, relative to each other, and/or an actual distance between the geometric objects can be determined. The determined actual angle and/or the actual distance can then be compared to a predetermined desired angle and/or a desired distance and, finally, the result of the comparison can be used to control the further processing of the print products.

The first object can furthermore be achieved with the aid of a device for quality inspection and testing of a flat print product, using the method according to embodiments of the invention. The device can comprise a support element for the print product, at least one light source, at least one image recording unit and an evaluation unit. In addition to recording, identifying and evaluating at least one structural element on the print product, the at least one image recording unit and the evaluation unit can also be used for recording at least one structural element on the support element, for determining a geometric object from the at least one structural element of the support element, for comparing actual values for the at least one geometric object to predetermined desired values for this geometric object and, finally, for using the result of the comparison to control a further processing of the print product.

The second object can be achieved with a support element, provided for feeding and removing a print product to be tested and inspected for quality. The support element can comprise a transport element, provided with a support surface that faces the print product and can have air-permeable openings, a blast air unit connected to the openings for permitting air to flow through, an air suction unit connected to the openings for the suctioning-in of air, as well as a circulating guide belt driven with the aid of rollers. The rollers and the guide belt can be arranged at an adjustable distance above the openings.

With the above-described method, and the device for realizing the method, it may be possible to inspect and test the quality of printed products, wherein numerous options can exist for this inspection and testing, based on the evaluation of geometric objects determined from the structural elements of the print product and the support element. The print product to be inspected and tested can furthermore be positioned optimally for an upcoming quality inspection, so that this inspection is not influenced by an incorrect positioning.

BRIEF DESCRIPTION OF THE DRAWINGS

Selected embodiments of the invention follow and are explained in further detail in the following description with the aid of the Figures and examples described below, which show in.

DETAILED DESCRIPTION

Figure 1:
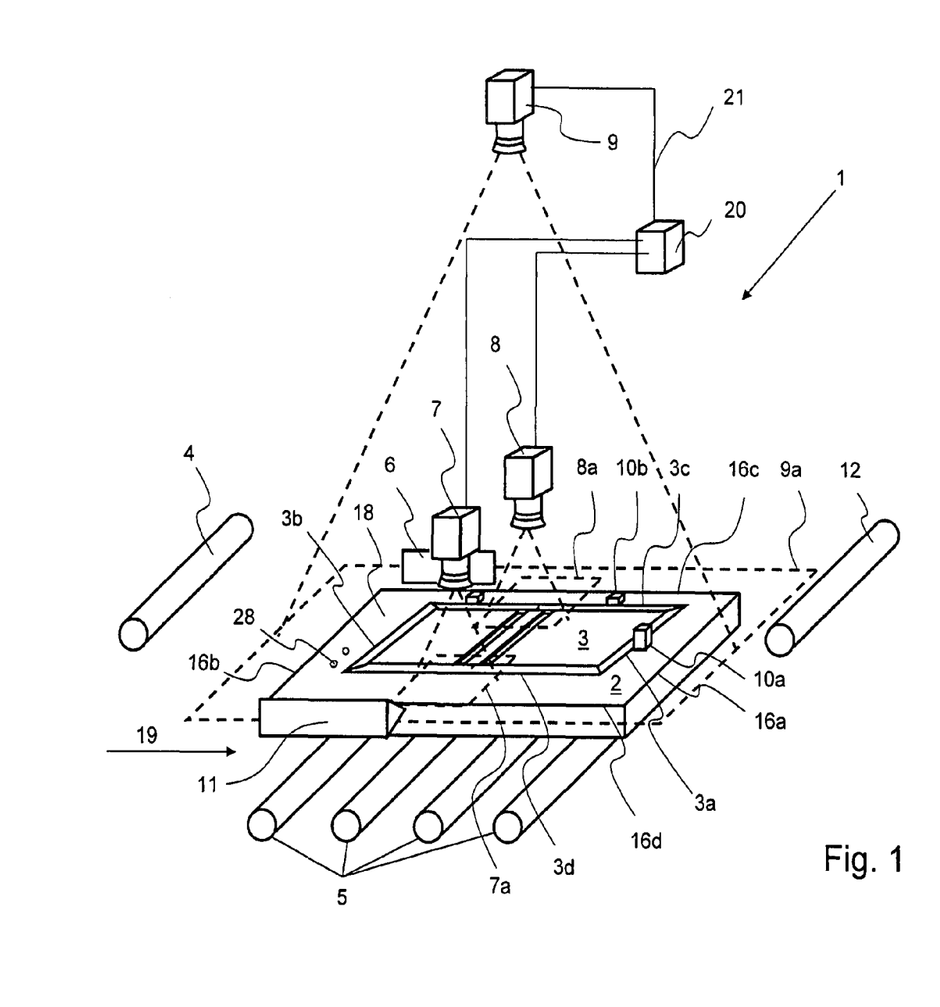
FIG. 1 A perspective view of a device according to an embodiment of the invention.

FIG. 1 shows a perspective view of a device 1 according to an embodiment of the invention. The device 1 comprises a support element 2 which can be embodied as a conveying element and/or as a suction table and which is provided with a support surface 18 for a flat print product 3 with four edges 3a, 3b, 3c and 3d, in this case embodied as a book cover. Different flat print products 3, for example a print sheet or a stack of print sheets, can also be supplied to the device 1 in a transporting direction 19. A number of light sources 4, 5, 6 and 12 are furthermore also provided. The device 1 additionally comprises a first, a second, and a third image recording units 7, 8, 9, wherein these are preferably cameras, as well as an evaluation unit 20 that is connected to the image recording units 7, 8 and 9. A mirror 11 is furthermore arranged on one edge of the support element 2, the function of which is explained further in connection with FIG. 4.

According to one embodiment the device 1 can comprise at least a first and at least a second end stop 10a, 10b which are respectively arranged on the support element 2. However, it is advantageous if respectively several first and several second end stops 10a, 10b are formed, wherein only one first end stop 10a and two second end stops 10b are shown in FIG. 1 for reasons of a clearer overview.

The first end stop 10a is arranged in the region of a first edge 16a of the support element 2, wherein the first edge 16a is arranged opposite a second edge 16b of the support element 2 past which the print product 3 moves when it first arrives on the support element 2. In other words, the first end stop 10a limits the movement of the print product 3 in the transporting direction 19. The second end stops 10b are arranged in the region of the third edge 16c of the support element 2 which is adjacent to the first and the second edge 16a, 16b. If the support element 2 is positioned at an angle, deviating from the horizontal plane, the third edge 16c is the one which is located in the direction in which the print product 3 moves along the support surface 18 because of the force of its weight. In other words, the support element 2 can also be positioned at a slant. In that case, the second end stops 10b are arranged in the region of the third edge 16c of the support element 2, which extends essentially parallel to the transporting direction 19, wherein this third edge 16c is arranged lower than a fourth edge 16d on the opposite side of the support element 2. If the print product 3 arrives in transporting direction 19 on the support element 2, it slides in the direction of the end stops 10a, 10b and is automatically aligned thereon.

As soon as the print product 3 rests on the support element 2 such that none of its edges 3a, 3b, 3c, 3d projects over the support element 2, it is secured in place by being suctioned against the support element 2. The support element 2 is provided for this with openings 28 which, in turn, are connected to an air suction unit that is not shown herein, wherein this will be explained in further detail in connection with FIGS. 5 and 6.

Following a recording of the images 7a, 8a, 9a of the print product 3 and the support element 2 with the respective image recording units 7, 8, 9, the end stops 10a and 10b are lowered or raised, if necessary, corresponding to the direction of the intended further transport of the print product 3. For example, the first end stop 10a is lowered or raised if the direction of further transport is identical with the transporting direction 19. If the support element 2 is positioned in a horizontal plane, it does not matter whether the second end stop 10b is arranged in the region of the third or the fourth edge 16c, 16d of the support element 2.

The light sources 4, 5, 6 and 12, shown in FIG. 1, function to illuminate the print products 3 and the support element 2 and are intended on the one hand to provide sufficiently exposed images 7a, 8a, 9a of the surface of the print product 3 and the support element 2 and, on the other hand, to generate specific effects which have a bearing on the image evaluation. These effects will be discussed in further detail during the explanation of the method and the image recording techniques that are used, in connection with the embodiments depicted in FIGS. 2 to 4. Of course, fewer light sources can also be provided if only a specific type of recording is desired. If several light sources 4, 5, 6, 12 are present, these can be used either individually or in any optional combination, wherein this also includes the repeated use of individual light sources for the illumination of successively recorded images of the same print product 3.

For example, the light source 4 can be switched on for respectively recording one image 7a, 9a, using the first and the second image recording units 7, 9. Once the first light source 4 is switched off, the fourth light source 12 can be switched on and an additional image 7a, 9a can respectively be recorded with the image recording units 7, 9 to obtain further information for the evaluation.

Relative to the plane for the support surface 18 for the print product 3 that is positioned on the support element 2, the first light source 4 and at least the first image recording unit 7 are arranged on the same side of the support element 2. For the present example, the other image recording units 8, 9 are also arranged on the same side of the support element 2. The second light source 5, which can include four light tubes that are essentially arranged parallel to each other for this embodiment, is arranged on a side of the support element 2 which is opposite the support element side on which the first light source 4 is arranged. For the present arrangement, for which the first light source 4 is arranged above the plane of the support surface 18, this means that the second light source 5 is arranged below the plane for the support surface 18 of the support element 2. The support element 2 in this case is embodied transparent and can comprise a light-diffusing layer. Of course, the second light source 5 can also be arranged within the support element 2. Relative to the plane for the support surface 18, at least the third light source 6 is arranged on the same side as the first light source 4, in a plane positioned at a right angle to the plane for the support surface 18 for the print product 3. As an alternative to the relatively compact design of the third light source 6, shown in FIG. 1, this light source can also be designed to have the same length as the third edge 16c of the support element 2. As previously described, the light sources 4, 5, 6, 12 are used for various lighting alternatives for recording the images 7a, 8a, 9a with the image recording units 7, 8 and 9.

At least two of the three image recording units 7, 8, 9, respectively, can be used for recording the images 7a, 8a of segments of the print products 3 and the support element 2, for this example the first and second image recording units 7, 8. The third image recording unit 9 is provided for recording the images 9a of the complete print product 3 and at least a section of the support element 2. The evaluation unit 20 which is connected to the image recording units 7, 8, 9 for the data transmission is embodied such that it receives the images 7a, 8a, 9a via signal lines 21 or, alternatively, also by wireless transmission and then evaluates these images 7a, 8a and 9a. The received images 7a, 8a and 9a correspond to the regions shown with dashed lines in FIGS. 1 and 3, meaning the first recording unit 7 is used to record the images 7a, the second recording unit 8 is used to record the images 8a and the third recording unit 9 is used to record the images 9a.

Figure 2:
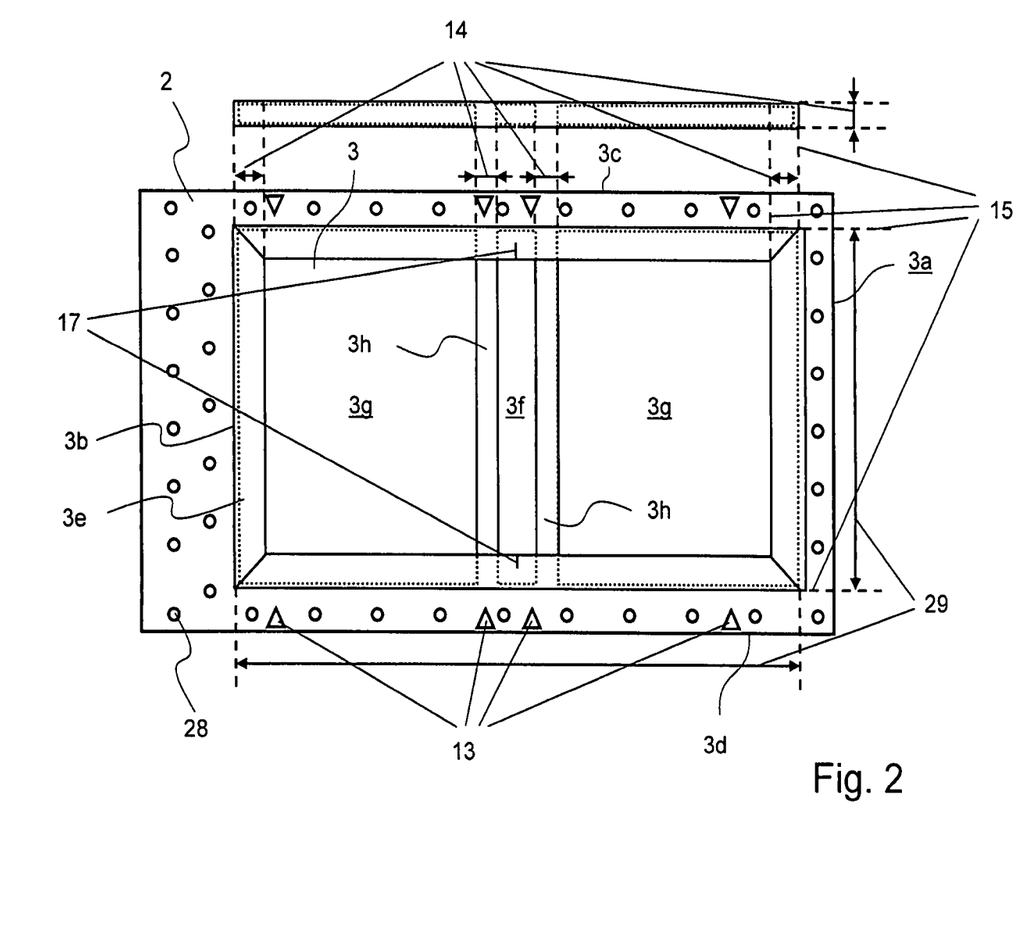
FIG. 2 A view from above of a print product arranged on a support element.

FIG. 2 depicts the markings and the layout of the support element 2 and the print product 3 according to an embodiment of the invention, which can be embodied as a book cover in this case.

FIG. 2 shows a view from above of a print product 3 that is embodied as four-part book cover and is arranged on the support element 2. The book cover comprises a folded over cover 3e and three cardboard sections, wherein the latter are shown in the form of partially dotted rectangles inside the cover 3e. The small, central cardboard section here forms a back insert 3f and the two large, outer cardboard sections respectively form a covering board 3g for the book cover. The regions shown between the back insert 3f and the covering boards 3g are part of the cover 3e of the book cover. These regions represent examples of structural elements of the book cover, meaning examples for the structural elements 3h of a print product 3. In general, the structural elements within the meaning of the invention are characterized by raised or lowered regions on the print product 3. However, the structural elements can also be formed by a print image affixed thereto, for example a marking, as well as the edges of the print product including its borders, by uneven locations in the material of the print product 3, or by ink splatters, dirt and the like. The term "shadow casting" in this connection and within the meaning of the present invention refers to shadowed regions generated on the print product 3 surface as a result of the incidence of light, owing to the illumination provided by the first and/or the fourth light source 4, 12, which are caused precisely by such structural elements. It must be noted that an arrangement on the side of the first and the fourth light source 4, 12 is preferred, meaning an arrangement where a straight line, starting from the light sources 4 and/or 12 and extending in a direction perpendicular to the plane of the support surface 18, does not hit the print product 3. This arrangement on the side of the light sources 4, 12 ensures that all structural elements on the surface of the print product 3 cast a shadow when they are illuminated. The support element 2 furthermore is provided with a marking representing an additional structural element 13, for which the form and position on the support element 2 are stored in the evaluation unit 20. For the present example, four markings are provided on the support element 2. The markings on the support element 2 can be printed on, meaning they can be two-dimensional structural elements 13 or also three-dimensional structural elements with a known geometry. Furthermore visible in FIG. 2 are markings on the print product 3 which represent additional structural elements 17. For this example, these structural elements 17 indicate the center of the print product 3, meaning the center of the book cover for the example described herein. The absolute position of the structural elements 17 can be determined by first determining their position relative to the structural elements 13 of the support element 2 and then converting this relative position to an absolute position by taking into consideration the absolute position of the structural elements 13 of the support element 2. Based thereon, a centering of the print image and an angle of rotation for the edges 3a, 3b, 3c, 3d of the print product 3 relative to the printed-on image can be determined, wherein this is explained further in connection with the embodiment depicted in FIG. 3.

FIG. 2 also shows structural elements 15 which can represent printed-on areas, the edges of bulges or depressions and height differences on the print product 3 or height differences between the support element 2 and the print product 3. Specifically, the contours of a shadow that is cast, possibly even the approximate contours, are also interpreted as structural elements. The structural elements 15 are defined by their geometric dimensions which, for example, can include lengths, angles, distances between two structural elements 15, or the angle of a structural element relative to another structural element 15. These types of two-dimensional or three-dimensional structural elements of the print product 3 and the support element 2 are visible as two-dimensional geometric objects in the images 7a, 8a, 9a which are recorded with the image recording units 7, 8 and 9. The markings on the print product 3 and/or the support element 2 and/or the structural elements 15 and/or the distances 14, 29 and/or the angle between the structural elements 15 either by themselves or in combination represent an aide for interpreting the respective images 7a, 8a, 9a, meaning their geometric objects, in the evaluation unit 20.

FIG. 2 furthermore shows the openings 28 in the support element 2 for blowing or suctioning in air. As previously mentioned, these openings 28 can be used, for example, to secure the print product 3 on the support element 2. Alternatively, different mechanisms which are known to one skilled in the art can also be considered, for example securing the print product with a transparent plate such as is used in museums where paintings are secured behind glass.

Figure 3:
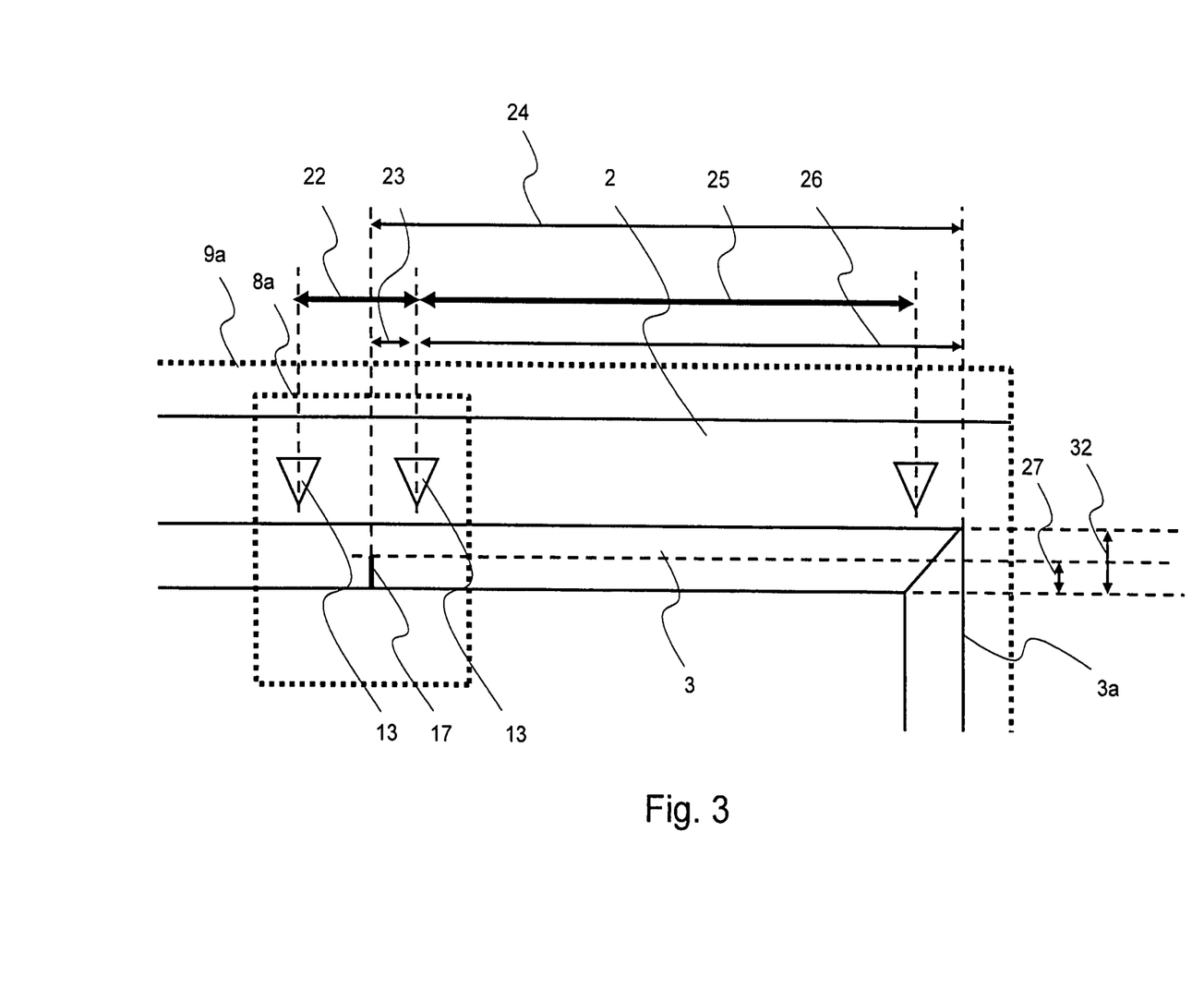
FIG. 3 A view from above of a section of an edge region of the support element, showing a portion of the print product.

FIG. 3 shows a view from above of an edge region of the support element 2 and of a segment of the print product 3 positioned on the support element 2 according to an embodiment of the invention. Also visible, at least in part, are the structural elements 13, 17 in the form of markings which are attached to the support element 2 and the print product 3, respectively. The dashed lines represent the images 8a and 9a, known from FIG. 1, taken by the second and/or the third image recording units 8, 9. The images 8a and 9a differ and overlap in such a way that one and the same structural element 13 of the support element 2, which is embodied as a marking, is visible in each of the two images 8a and 9a. In particular, the images recorded of this configuration, or also other configurations, with the image recording units can at least jointly show the complete print product 3. Various distances are furthermore shown in FIG. 3 with the aid of double arrows which will be discussed in further detail below. The double arrows 22 and 25, marked with bold lines, describe the distances between the structural elements 13 of the support element 2 which are embodied as markings and for which the absolute position is known. When showing an example of a test step for the print product 3, other distances 23, 24, 26, 27 and 32 must be detected which are not known to the evaluation unit 20. In this case, the distance 23 added to the distance 26 results in the distance 24 which reflects the distance of the structural element 17 of the print product 3, which is embodied as marking, from the edge 3a of the print product and which provides information relating to a correct or incorrect centering of the print product 3. Analogous thereto, this determination can also be carried out for the edge 3b of the print product 3 which is arranged opposite the edge 3a.

To determine the distance 24, respectively one image 8a, 9a is recorded with the image recording units 8 and/or 9. In the process, at least one structural element 13 which is embodied as marking on the support element 2 is recorded with the aid of the image recording units 8, 9 and is transmitted in the form of a geometric object to the evaluation unit 20. A magnification and distortion factor of the image recording units 8, 9 is subsequently determined in the evaluation unit 20 by comparing recorded dimensions and recorded positions to absolute desired values for this structural element 13. In particular, the marking is shown in the images 8a, 9a of the illuminated print product 3. In other words, a type of calibration of the image recording units 8, 9 takes place during this step. This can be achieved with the aid of separate images 7a, 8a, 9a or it can be integrated into the recording of the image 9a to be used and/or a section of the image 8a, wherein the latter is preferred. The primary advantage of this is that with each image 7a, 8a, 9a of a print product 3 that is to be examined or inspected, a calibration takes place simultaneously with the recording of the image 7a, 8a, 9a of a print product 3 to be examined. As a result, very accurate evaluations can be realized since the parameters and the position of the image recording units which can change due to heat or vibrations, for example, are taken into consideration for each image 8a and 9a. Actual values for the dimensions and the position of the structural elements 15 are determined by taking into consideration the magnification and distortion factor. For the present example, the absolute distance 26 between a structural element 13 of the support element 2, embodied as a marking, and the edge 3a of the print product 3 can be determined from the corresponding distance on the print image by evaluating the image 9a that is recorded by the image recording units 9 and by taking into consideration the aforementioned magnification and distortion factors. In the same way, the absolute distance 23 between a structural element 13 of the support element 2 and a structural element 17 embodied as marking on the print product 3 can be determined from the image 8a recorded by the image recording unit 8. Adding these distance values results in the desired absolute distance 24 between the edge 3a of the print product 3 and its structural element 17 which is embodied as a marking. Based thereon as well as on known, predetermined desired distances, the evaluation unit 20 can then determine whether the print product 3 is centered correctly. Thus, at least two images 8a, 9a of the print product 3 and of the support element 2 can be recorded with at least two different image recording units 8, 9, wherein at least one and the same structural element 13 of the support element 2, embodied as a marking, is shown in each of the images 8a and 9a. The position of a printed image on the print product 3, which is visible in an image and is embodied as structural elements 17 in the form of position markings, can be identified in the same way in the evaluation unit 20, can then be compared to predetermined, desired values for the position of these structural elements 17, and the comparison results can subsequently be used for controlling the further processing of the print products 3. Depending on the position of the image recording units 8, 9, these images 8a, 9a can also be recorded using different magnification factors.

According to a further aspect of the invention, during the evaluation of the recorded images 7a, 8a and 9a, the situation can occur where components of the device 1 are arranged in the optical path for the image recording units 7, 8 and 9. For example, a holding rod required for the structure of the image recording unit 8 can appear in the image 9a which is recorded by the image recording unit 9 arranged at a higher location, thereby possibly leading to incorrect evaluations by the evaluation unit 20. Thus, if these components are arranged in the optical path of one of the image recording units during the recording of the images 7a, 8a, and 9a and conceal a portion of the image, the concealed regions are subsequently faded out in the evaluation unit 20. In connection with the present case, the term "faded out" should be understood within the meaning of "computed out" or "ignored."

According to a different aspect of the invention, at least one of the image recording units 7, 8, 9 automatically triggers the recording of at least one image 7a, 8a and 9a. For example, video cameras can be used which continuously film the support element 2 and/or a section of the support element 2. As soon as a print product 3 appears in the image, it is detected by the image detection device which is not shown herein, and a snapshot is taken and subsequently transmitted to the evaluation unit 20. On the one hand, this is advantageous since no external trigger that would have to be adapted to the frequency of the arrival of the print products 3 is needed for recording the images 7a, 8a, 9a while, on the other hand, images of the transported print products 3 can also be recorded. A transporting speed for the print products 3 can thus also be determined from the images 7a, 8a and 9a which are recorded successively with a time lag.

Figure 4:
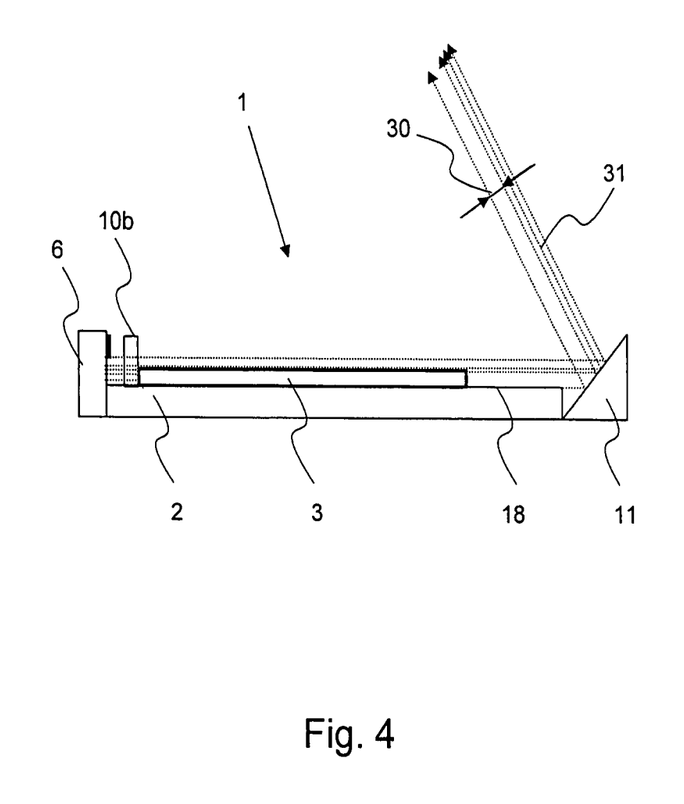
FIG. 4 A view from the side for determining the components of the device used for generating a shadow profile.

FIG. 4 shows a view from the side of the components of the device 1 which are used for detecting a shadow profile according to an embodiment of the invention. In this representation, the image recording units 7, 8 and 9 as well as other components of the device 1 are omitted for reasons of clarity. Shown are only the cross sections through the support element 2 and the thereon positioned print product 3, the third light source 6, the mirror 11 and the second end stop 10b. If the third light source 6 is arranged on the side of the support element 2, essentially in the plane for the support surface 18, the mirror 11 is arranged on the side of the support element 2 that is opposite the third light source 6, as can be seen in FIG. 4. Owing to the illumination of the print product 3 from the side of the support element 2 with the aid of the third light source 6, a shadow profile 30 is cast which is then recorded by one of the image recording units 7, 8, 9, preferably the image recording unit 9. With the arrangement shown herein, the light rays 31 from the third light source 6 are deflected with the mirror 11 in the direction of the third image recording unit 9. The mirror 11 is oriented at an angle to the support element 2, such that the third image recording unit 9 images a plane for the print product 2 in the form of a line. So that the light rays 31 reach the mirror 11 and thus also the third image recording unit 9, the second end stop 10b is embodied transparent. With a different arrangement, the above-provided explanations can apply to the first end stop 10a. For an alternative arrangement that is not shown herein, an image recording unit can be positioned in place of the mirror 11 in such a way that it receives the light arriving from the third light source 6.

As mentioned in the above, a shadow profile 30 can be generated when the print product 3 is illuminated from the side. As a result, the third image recording unit 9 can receive an image which, for the example shown in FIG. 4, reflects the thickness of the print products 3. On the one hand, this is advantageous when testing to determine whether the print product 3 has the required thickness while, on the other hand, it allows detecting the presence of uneven areas and/or undesirable structural elements, such as color splatters or dirt particles on the surface of the print products 3. For this, the measured thickness value can be compared to a desired thickness value which is stored in the evaluation unit 20. If the measured thickness value is less than the desired thickness value, it is an indication that the print product 3 was produced with a material that is too thin, meaning the wrong type of material. If the measured thickness value is more than the desired thickness value, either the material used to produce the print product could be too thick or the material could have uneven locations. These uneven locations can either be contained in the material itself which is used for the print product 3, or the surface of the support element 2 can contain uneven locations, or the surface of the print product 3 can contain impurities, wherein a combination of these flaws can be present as well. An uneven location on the surface of the support element 2 can be detected with a similar measurement, but without the print product 3 positioned thereon. Possible impurities on the surface of the print product 3 can be detected with the aid of a different test.

During the further testing, and while the print product 3 is illuminated essentially from outside of the plane for the support surface 18 of the support element 2, for example with the aid of the first light source 4, a shadow that is cast as a result and is not shown herein can be recorded with at least one of the remaining image recording units 8, 9. The difference between a cast shadow and a cast shadow profile is to be explained in this connection. As mentioned in the above, the cast shadow represents the shadow of a structural element which is cast on the surface of the print product 3 or the support element 2 and which represents a more or less elongated or compressed image of the structural element on the aforementioned surface. The cast shadow profile, on the other hand, refers to the shadow generated during an illumination from the side which images the profile of a structural element and/or of an uneven location.

The recorded image of the cast shadow can be transmitted to the evaluation unit 20. Based thereon, at least one additional geometric object is computed in the evaluation unit 20, is then compared to a corresponding desired value, and the result of the comparison is used for controlling the further processing operation of the print product 3.

Figure 5:
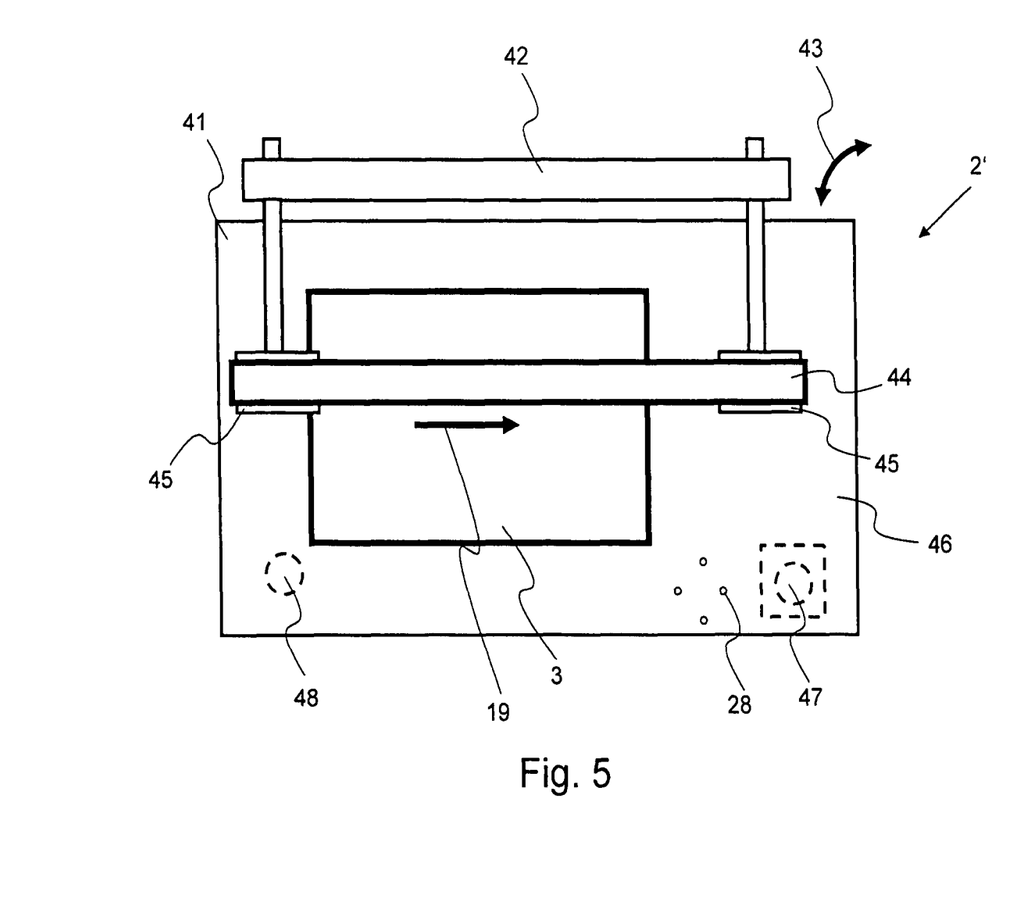
FIG. 5 A view from above of a support element according to an embodiment the invention.

FIG. 5 shows a view from above of a support element 2' for print products 3 that is used in a device 1, preferably for the feeding and removing of a print product 3 which in this case is a book cover. The support element comprises a transport element 41, provided with a support surface 46 that faces the print product 3 and with air-permeable openings 28, wherein only four openings are shown for this example. Furthermore provided are a blast air unit 48, which is connected to the openings 28 so as to permit air to flow through, an air suction unit 47 connected to the openings 28 for suctioning-in air, as well as a circulating guide belt 44 which can be circulated with driven rollers 45 and is preferably embodied as a belt. The rollers 45 and the guide belt 44 are arranged at a changeable distance 49 (see FIG. 6) above the openings 28, as shown with a double arrow. The assembly comprising the rollers 45 and the guide belt 44 is attached to a pivoting support 42 which can be raised and/or lowered.

The rollers 45 can be driven so as to allow the guide belt 44 to move in transporting direction 19 for the print product 3, as well as in the opposite direction. To interrupt the movement of the guide belt 44, the rollers 45 are embodied such that they can be stopped.

The distance 49 between the rollers 45 with the guide belt 44 and the openings 28 can be changed with the aid of the support 42. The support can be designed to carry out a perpendicular movement for lifting up the rollers 45, relative to the support surface 46, wherein this can be advantageous if the thickness of the print product 3 to be examined varies or if a stack composed of print products is supplied. In addition or optionally thereto, the rollers 45 and the guide belt 44 can be pivoted around a longitudinal axis of the support 42 which is not shown herein. This type of embodiment is particularly advantageous if a quality inspection is to be carried out once the print product 3 is secured on the support surface 46 of the transport element 41. As a result of the pivoting ability of the rollers 45 and the guide belt 44, these components of the device 1 do not interfere during the recording of the images 7a, 8a and 9a with the image recording units 7, 8 and 9. A fading out of these components later on in the evaluation unit 20 is therefore also not necessary. This contributes to the quality of the evaluation since associated surface regions of the print product 3, which are located underneath the concealing component, cannot be reconstructed following the fading out. According to a different embodiment, the rollers 45 and the guide belt 44 can be pivoted to a position on the side of the support surface 46, which is indicated roughly with a double arrow 43.

Of course, the support element 2' can also be provided with a second guide belt with second rollers, wherein this is not shown herein. The second rollers can be arranged parallel to or transverse to the driving direction for the first belt.

According to an embodiment, the surface condition of the first and/or the second guide belt can be such that it ensures a frictional adherence with a print product.

Figure 6:
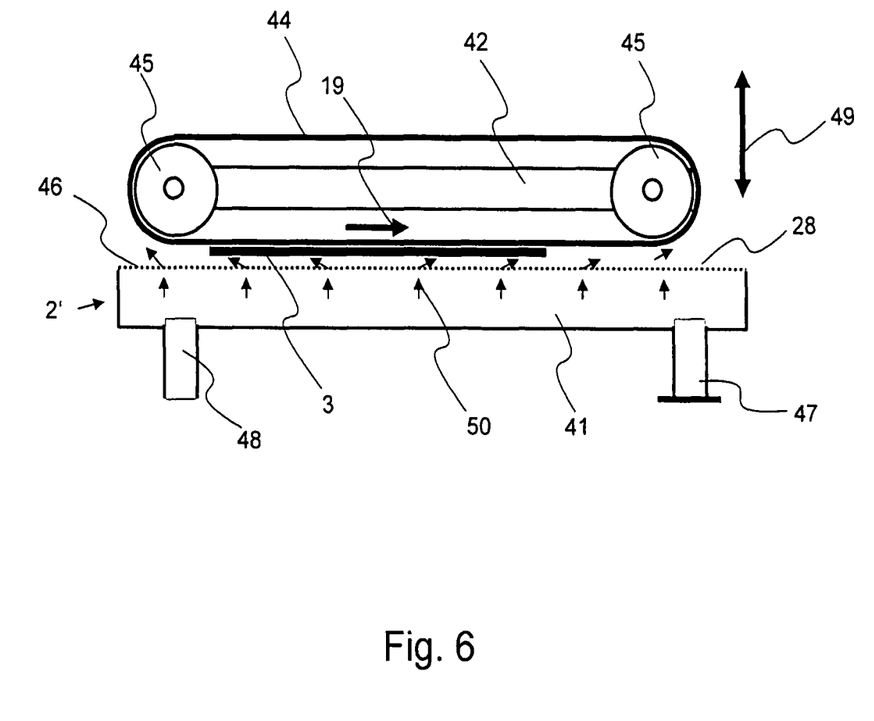
FIG. 6 A view from the side of the support element according to an embodiment of the invention.

A possible mode of operation of the support element 2' is explained in the following with reference to the embodiment depicted in FIG. 5. The print product 3 can be moved with the aid of the blast air unit 48 in the direction of the air suction unit 47, meaning in transporting direction 19. Upon detecting a print product 3 that arrives on the support element 2', for example with the aid of detectors such as infrared detectors which are known to one skilled in the art, the blast air unit 48 can be activated and the arriving print product is lifted up, as shown in FIG. 6 with the arrows 50 that indicate the air flow. The print product 3 can thus be pressed against the guide belt 44 which is driven in transporting direction 19 by the rollers 45. The guide belt 44 subsequently carries along the print product 3 in a guided manner. As soon as the print product 3 has reached the location where an image is to be recorded, e.g., above the support surface 46, the blast air unit 48 can be shut down and the print product 3 can drop onto the support surface 46, whereupon it is suctioned on and secured on the support surface 46 by activating the suctioning unit 47. With the aid of a precise control of the blast air unit 48 and the air suction unit 47, it can be ensured that the print product 3 is actually positioned at the intended location on the support surface 46. Following the securing of the product, the rollers 45 and the guide belt 44 can be pivoted away once more, so as to allow the recording of an image of the print product 3, in the manner as explained in connection with FIGS. 1 to 4. The rollers 45 can subsequently be lowered again together with the guide belt 44 and the blast air unit 48 can be activated. The print product 3 can thus be conveyed to a further processing station which is not shown herein and which directly adjoins the support surface 46. The removal direction of the print product 3 can be changed, if applicable, when using two roller pairs with respectively one guide belt, as explained in the above. The rollers 45 with the guide belt 44, for example, can take over the print product 3 upon its arrival and second rollers with a second guide belt can then take over the print product 3 for its removal in a direction that is rotated, for example, by 90° as compared to the earlier transporting direction 19 for the print product 3. Of course, it is also conceivable that with an embodiment using roller pairs which can be pivoted to the side, as explained for the rollers 45 in the above, the angle of the removal direction can be adapted to the given requirements of the further processing system.

In summary, embodiments of the invention can provide numerous options for the quality inspection and testing of a print product 3. For this, at least one structural element 13 of the support element 2, 2' is recorded in addition to the at least one structural element 3a, 3b, 3c, 3d, 3e, 3f, 3g, 3h, 15, 17 of the print product 3, and a geometric object of the support element 2, 2' is determined from the at least one structural element 13 of the support element 2, 2'. The actual values for the at least one geometric object of the support element 2, 2' are then compared to predetermined desired values for this geometric object and, finally, the result of this comparison is used for controlling a further processing of the print product 3.

In addition, the geometric objects determined from the structural elements 3a, 3b, 3c, 3d, 3e, 3f, 3g, 3h, 15, 17 of the print product 3 and from the structural elements 13 of the support element 2, 2' can be linked to each other and an actual angle can be determined for the geometric objects, relative to each other, and/or an actual distance between the geometric objects can be determined. The determined actual angle and/or the actual distance is then compared to a desired angle and/or a desired distance and, finally, the result of the comparison is used to control the further processing of the print product 3.

Uneven locations on the print product 3 or the support surface 18 of the support element 2, as well as artifacts and impurities on the surface of the print product 3, can thus be detected with the aid of special lighting and the subsequent recording with different image recording units 7, 8, 9. The thickness of the print product 3 can furthermore be computed and can also be compared to desired values by illuminating the product from the side and by recording the profile of a shadow that is cast. The position of the edges 3a, 3b, 3c, 3d of the print product 3, meaning of additional structural elements, can furthermore be determined, for example, so as to check the correct trimming and/or the correct orientation of the print product 3. The position of the print image on the print product 3 and/or the parallelism of the edges 3a, 3b, 3c and 3d can furthermore also be detected by using and evaluating the position of the structural elements 17, 13 which are embodied as markings on the print product 3 and the support element 2.

Even though advantageous embodiments of the invention have been shown and described herein, the invention is not restricted to these but can also be embodied and used differently within the scope of validity of the following claims.

The invention claimed is:

1. A method for the quality inspection and testing of a flat print product, comprising:
   depositing the print product on a support element, wherein the print product includes at least one first structural element and the support element includes at least one second structural element;
   illuminating the print product and the support element by at least one light source;
   recording, by at least one image recording device, at least one image of the illuminated print product and at least part of the support element;
   determining, in an evaluation unit, at least one geometric object of the print product and at least one geometric object of the support element on the basis of the at least one first and at least one second structural elements, respectively;
   comparing actual values for the at least one geometric object of the print product and the at least one geometric object of the support element to predetermined desired values for the at least one geometric object of the print product and the at least one geometric object of the support element; and
   controlling a further processing of the print product using a result of the comparison.

2. The method according to claim 1, wherein the geometric objects determined from the at least one first structural element of the print product and the at least one second structural element of the support element are linked to each other,
   wherein the determining comprises determining at least one of (a) an actual angle for the geometric objects relative to each other and (b) an actual distance between the geometric objects,
   wherein the comparing comprises comparing the at least one of the determined actual angle and the actual distance to a predetermined desired angle and desired distance, respectively, and
   wherein the controlling comprises controlling the further processing of the print product using the result of the comparison.

3. The method according to claim 1, further comprising:
   transmitting the recorded at least one image to the evaluation unit, wherein the determining comprises determining, in the evaluation unit, a magnification and distortion factor of the at least one image recording unit by comparing recorded dimensions and position of the at least one second structural element of the support element to absolute values for the at least one second structural element of the support element.

4. The method according to claim 3, wherein the determining comprises determining actual values for the dimensions and position of the at least one second structural element of the support element, taking into consideration the determined magnification and distortion factor.

5. The method according to claim 1, wherein the illuminating comprises illuminating the print product from a side of the support element, substantially in a plane of the print product, to cast a shadow profile of the at least one first structural element of the print product; and the method further comprises:
   transmitting the shadow profile of the at least one first structural element of the print product to the at least one image recording device with the aid of a mirror.

6. The method according to claim 1, wherein the illuminating comprises illuminating the print product, substantially outside of a plane for the print product, whereby a shadow is cast by at least one first structural element of the print product, which shadow is recorded with the at least one image recording device; and the method further comprises:
   transmitting the recorded image to the evaluation unit;
   computing, in the evaluation unit, at least one additional geometric object from the recorded image; and
   controlling the further processing of the print product based on the computed at least one additional geometric object.

7. The method according to claim 1, wherein the recording comprises recording at least two images of the print product and the support element with at least two different image recording devices, wherein at least one same second structural element of the support element is shown in each of the images.

8. The method according to claim 7, wherein at least two different image recording devices are used to record the at least two images with different magnification factors.

9. The method according to claim 1, wherein the at least one image recording device automatically triggers the recording of the at least one image.

10. The method according to claim 1, wherein the recording comprises successively recording images of the at least one print product with a time lag, and wherein the method further comprises:
determining a transporting speed for the print products based on the successively recorded images of the at least one print product with the time lag.

11. The method according to claim 1, further comprising:
holding the print product by suction against the support element prior to recording the at least one image.

12. A device for the quality inspection and testing of a flat print product, said device comprising:
a support element to support the print product, wherein the print product includes at least one first structural element and the support element includes at least one second structural element;
at least one light source configured and arranged to illuminate the print product;
at least one image recording unit; and
an evaluation unit,
wherein the at least one image recording unit and the evaluation unit are configured and arranged to record at least one image of the illuminated print product and at least part of the support element,
wherein the evaluation unit is configured to determine at least one geometric object of the print product and at least one geometric object of the support element from the first and second structural elements, respectively, in the at least one recorded image and to compare actual values for the at least one geometric object of the print product and the at least one geometric object of the support element to predetermined, desired values for said geometric objects, and
wherein the evaluation unit is configured to use the result of such comparison for controlling a further processing of the print product.

13. The device according to claim 12, wherein the evaluation unit is configured to link the at least one geometric object of the print product and the at least one geometric object of the support element and to determine at least one of (a) an actual angle of the geometric objects, relative to each other, and (b) an actual distance between the geometric objects, wherein the evaluation unit is configured to compare the at least one of the determined actual angle and actual distance to a predetermined desired angle and distance, respectively, and wherein the evaluation unit is configured to use the comparison result for controlling the further processing of the print product.

14. The device according to claim 12, wherein, relative to a plane for a support surface of the print product, a first light source of the at least one light source and a first image recording unit of the at least one image recording unit are arranged on a same side of the support element.

15. The device according to claim 12, wherein a shape and position of the at least one second structural element of the support element are stored in the evaluation unit.

16. The device according to claim 12, wherein the support element comprises a conveying element.

17. The device according to claim 14, wherein the at least one light source comprises a second light source arranged on a side of the support element opposite the first light source.

18. The device according to claim 17, wherein the at least one light source comprises a third light source, wherein the third light source is arranged on the same side as the first light source relative to the plane for the support surface of the print product on the support element, and wherein the third light source is arranged in a plane extending at a right angle to the plane for the support surface.

19. The device according to claim 18, further comprising a mirror arranged on a side of the support element opposite the third light source.

20. The device according to claim 19, wherein the mirror is oriented at an angle to the support element, whereby the at least one image recording unit images the plane for the print product in the form of a line.

21. The device according to claim 12, further comprising
a first end stop arranged on a first edge of the support element located opposite a second edge of the support element, wherein the first end stop is transparent, and wherein the print product passes the second edge first upon being deposited on the support element.

22. The device according to claim 21, further comprising
a second end stop arranged on a third edge of the support element which third edge is adjacent to the first and second edges, wherein the second end stop is transparent, and wherein if the support element is positioned at an angle that deviates from a horizontal plane, the third edge is the edge the print product would move toward along the support surface as a result of the force of its weight.

23. The device according to claim 12, wherein the at least one image recording unit comprises at least two image recording units configured to respectively record images of the print product and the support element, wherein the images recorded with the at least two image recording units differ and overlap such that the same second structural element of the support element is visible in each of the two images and the images at least jointly show the complete print product.

24. The device according to claim 12, wherein the support element is transparent and includes a light-diffusing layer.

25. The device according to claim 12, wherein the support element further comprises:
a transport element having a support surface arranged to face the print product and including air-permeable openings;
a blast air unit fluidly connected to the openings to allow air to flow through;
an air suction unit fluidly connected to the openings for suctioning-in air; and
a circulating guide belt driven with rollers, wherein the rollers and the guide belt are arranged at a changeable distance above the openings.

26. The support element according to claim 25, wherein the rollers are drivable so that the guide belt moves in a transporting direction of the print product as well as counter to the transporting direction of the print product, and wherein the rollers are configured to be stopped in order to stop the movement of the guide belt.

27. The support element according to claim 25, further comprising a support configured and arranged to adjust a distance from the rollers and the guide belt to the openings, wherein the rollers and the guide belt are pivotably arranged with the support toward a side of the support surface provided with the openings.

* * * * *